US009653923B2

(12) United States Patent
van der Iee et al.

(10) Patent No.: US 9,653,923 B2
(45) Date of Patent: May 16, 2017

(54) RESONANT POWER MANAGEMENT ARCHITECTURES

(75) Inventors: Reinierus Hendricus Maria van der Iee, Lake Forest, CA (US); Kerry Thompson, Fort Collins, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 583 days.

(21) Appl. No.: 13/316,795

(22) Filed: Dec. 12, 2011

(65) Prior Publication Data

US 2013/0147273 A1    Jun. 13, 2013

(51) Int. Cl.
| | | |
|---|---|---|
| *H02J 3/14* | (2006.01) | |
| *H02J 4/00* | (2006.01) | |
| *H02M 3/335* | (2006.01) | |
| *H02M 1/00* | (2006.01) | |
| *H02M 7/48* | (2007.01) | |

(52) U.S. Cl.
CPC ........... *H02J 4/00* (2013.01); *H02M 3/33561* (2013.01); *H02M 2001/008* (2013.01); *H02M 2007/4815* (2013.01); *Y02B 70/1433* (2013.01); *Y02B 70/1441* (2013.01); *Y10T 307/406* (2015.04)

(58) Field of Classification Search
USPC .................. 307/2, 31, 34, 36, 109, 112, 129
See application file for complete search history.

(56) References Cited

U.S. PATENT DOCUMENTS

| | | | |
|---|---|---|---|
| 4,942,511 A | 7/1990 | Lipo et al. | |
| 5,444,608 A | 8/1995 | Jain et al. | |
| 5,737,706 A * | 4/1998 | Seazholtz et al. | ............ 455/466 |
| 6,333,939 B1 * | 12/2001 | Butler | ....................... G06F 1/08 |
| | | | 370/350 |

(Continued)

FOREIGN PATENT DOCUMENTS

| | | |
|---|---|---|
| TW | 201019570 A | 5/2010 |
| TW | 201131938 A | 9/2011 |

OTHER PUBLICATIONS

Angel Gentchev, High Frequency Quasi Square Wave Bus Voltage for the Next Generation of Distributed Power Systems, Oct. 2009, p. 1 of 15.*

(Continued)

*Primary Examiner* — Hal Kaplan
*Assistant Examiner* — Xuan Ly
(74) *Attorney, Agent, or Firm* — McDermott Will & Emery LLP

(57) ABSTRACT

Disclosed are various embodiments of resonant power management of a mobile device. In one embodiment, a mobile device including a power management unit (PMU) including a resonant inverter, a plurality of AC/DC converters, and an AC bus configured to route the AC power from the resonant inverter to the plurality of AC/DC converters. The resonant inverter converts DC power from a power source to AC power that is converted to DC power by the AC/DC converters and supplied to loads of the mobile device. In another embodiment, a method for power management of a mobile device includes monitoring, by a PMU of the mobile device, an operating mode of the mobile device and adjusting an output frequency of a resonant inverter of an AC power distribution network of the PMU in response to a change in the operating mode of the mobile device.

20 Claims, 6 Drawing Sheets

(56) References Cited

U.S. PATENT DOCUMENTS

| | | | | |
|---|---|---|---|---|
| 2002/0167824 | A1* | 11/2002 | Boeke et al. | 363/24 |
| 2004/0095020 | A1* | 5/2004 | Kernahan | H02M 3/157 307/35 |
| 2004/0130916 | A1* | 7/2004 | Baarman | A61L 2/10 363/21.02 |
| 2007/0297200 | A1* | 12/2007 | Ranstad | 363/21.02 |
| 2009/0067205 | A1* | 3/2009 | Oyobe | B60L 11/1842 363/98 |

OTHER PUBLICATIONS

Angel Gentchev, High Frequency Quasi Square Waves Bus Voltage for the Next Generation of Distributed Power Systems, Oct. 2009, p. 1 of 15.*

C.K. Tse, On Lossless Switched-Capacitor Power Converters, May 1995, p. 286-291.*

Zhongming Ye, Circulating Current Minimization in High-Frequency AC Power Distribution Architecture With Multiple Inverter Modules Operated in Parallel, Oct. 2007, p. 2673-2687.*

Angel Gentchev, An AC High Frequency Quasi Square Waves Bus Voltage for the Next Generation of Distributed Power Systems, Oct. 2009, p. 1 of 15.*

C.K Tse, On Lossless Switched-Capacitor Power Converters, May 1995, p. 286-291.*

Zhongming Ye et al., "A full-bridge resonant inverter with modified phase-shift modulation for high-frequency AC power distribution systems," IEEE Transactions on Industrial Electronics, Oct. 2007, pp. 2831-2845, vol. 54, No. 5.

Zhongming Ye, et al., "Circulating Current Minimization in High-Frequency AC Power Distribution Architecture With Multiple Inverter Modules Operated in Parallel," IEEE Transactions on Industrial Electronics, Oct. 2007, pp. 2673-2687, vol. 54, No. 5.

Josef Drobnik, et al., "PC Platform Power Distribution System," IEEE Telecommunication Energy Conference, Jun. 1999, 6 pages.

Gentchev et al.: An AC High Frequency Quasi Square Wave Bus Voltage for the Next Generation of Distributed Power Systems; Presented and published in Proceedings of High Frequency Power Conversion HFPC '98 Conference, (Nov. 1998), Revised Oct. 14, 2000, Updated Oct. 2009; http://www.ad-and-.com/teehpapers.html (Oct. 2011).

Tse et al.: On Lossless Switched-Capacitor Power Converters; IEEE Transactions on Power Electronics, vol. 10, No. 3, (May 1995).

* cited by examiner (a)

(b)

(c)

RESONANT POWER MANAGEMENT ARCHITECTURES

BACKGROUND

Many mobile devices utilize a power management unit (PMU) to govern power functions of digital platforms. Current PMU topologies distribute direct current (DC) power using a mix of DC/DC converters and linear or low dropout (LDO) regulators. The energy loss when using such PMU topologies can be 25% of the system power consumption. The performance of the mobile device, as well as the battery power supply, is limited by these losses. Increasing the load demand on a PMU can amplify the adverse performance effects.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
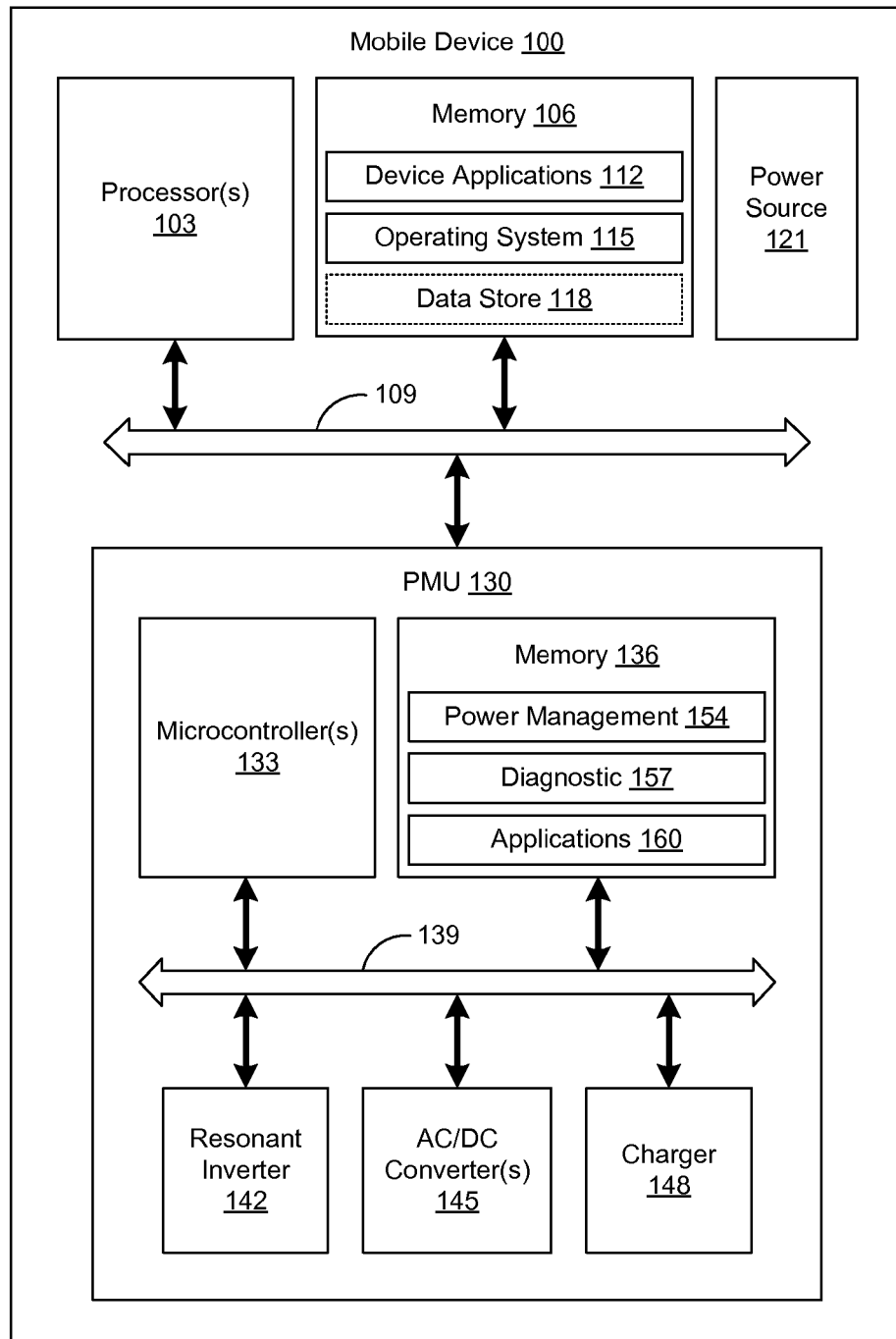
FIG. 1 is a schematic block diagram of a mobile device including a power management unit (PMU) in accordance with various embodiments of the present disclosure.

With reference to FIG. 1, shown is a schematic block diagram of a mobile device 100 such as, but not limited to, a mobile phone, personal digital assistant (PDA), laptop computer, electronic tablet, or other electronic device including a self-contained power source 121 such as, e.g., a battery or other rechargeable power source. The mobile device 100 includes at least one processor circuit or system-on-chip (SoC), for example, having a processor 103 (e.g., a system processor) and a memory 106, both of which are coupled to a local interface 109. The processor 103 may represent multiple processors 103 and the memory 106 may represent multiple memories 106 that operate in parallel processing circuits, respectively. The mobile device 100 includes other components (e.g., keypads, displays, speakers, microphones, amplifiers, interfaces, switches, antennas, etc.) to implement the functionality of the mobile device 100 as can be appreciated. The local interface 109 may comprise, for example, a data bus with an accompanying address/control bus or other bus structure as can be appreciated.

Stored in the memory 106 are both data and several components that are executable by the processor 103. In particular, stored in the memory 106 and executable by the processor 103 are device applications 112 and potentially other applications that may be implemented by the mobile device 100. In addition, an operating system 115 may be stored in the memory 106 and executable by the processor 103. Also stored in the memory 106 may be a data store 118 and other data.

It is understood that there may be other applications that are stored in the memory 106 and are executable by the processor 103 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

The mobile device 100 also includes a power management unit (PMU) 130 that manages power functions of the mobile device 100 and its components. The PMU 130 may be a separate integrated circuit or may be included as part of a SoC. The PMU 130 includes at least one processor circuit, for example, having a microcontroller 133 and a memory 136, both of which are coupled to an internal interface 139. The microcontroller 133 may represent multiple microcontrollers 133 and the memory 136 may represent multiple memories 136 that operate in parallel processing circuits, respectively. In addition, the PMU 130 may include, e.g., a resonant inverter 142, one or more alternating current to direct current (AC/DC) converters(s) 145, power source (e.g., battery) charger(s) 148, real-time clock, analog-to-digital (A/D) converter(s), and/or other components coupled to the internal interface 139. The internal interface 139 may comprise, for example, a data bus with an accompanying address/control bus, serial bus, or other bus structure as can be appreciated. In some embodiments, the mobile device 100 may include a backup battery to supply backup power to the PMU 130.

Stored in the memory 136 are both data and several components that are executable by the microcontroller 133. In particular, stored in the memory 136 and executable by the microcontroller 133 are services for power management 154 of the mobile device 100, as well as service(s) for diagnostics 157 and other applications 160 of the PMU 130. Also stored in the memory 136 may be a data store and other data. Memory 136 may include memory that is external to and accessible by the PMU 130. It is understood that there may be other applications that are stored in the memory 136 and are executable by the microcontroller 133 as can be appreciated. Where any component discussed herein is implemented in the form of software, any one of a number of programming languages may be employed.

The memory 106 and 136 is defined herein as including both volatile and nonvolatile memory and data storage components. Volatile components are those that do not retain data values upon loss of power. Nonvolatile components are those that retain data upon a loss of power. Thus, the memory 106 and 136 may comprise, for example, random access memory (RAM), read-only memory (ROM), hard disk drives, solid-state drives, USB flash drives, memory cards accessed via a memory card reader, optical discs accessed via an optical disc drive, and/or other memory components, or a combination of any two or more of these memory components. In addition, the RAM may comprise, for example, static random access memory (SRAM), dynamic random access memory (DRAM), or magnetic random access memory (MRAM) and other such devices.

The ROM may comprise, for example, a programmable read-only memory (PROM), an erasable programmable read-only memory (EPROM), an electrically erasable programmable read-only memory (EEPROM), or other like memory device.

The PMU 130 may coordinate management functions such as, e.g., monitoring power usage and power source charge, power source charging, controlling power distribution, regulating the real-time clock, and controlling power saving functions such as standby, hibernate, sleep, and shutdown of components of the mobile device 100 and/or the mobile device 100 itself. In addition, the PMU 130 may carry out other functions or features such as, e.g., adaptive power management of the mobile device 100, communication with processor 103 through high level state commands, identification of power supply types, self-testing of PMU 130 for diagnostics, etc. Services may be executed by the microcontroller 133 for implementation of the functions.

Figure 2A:
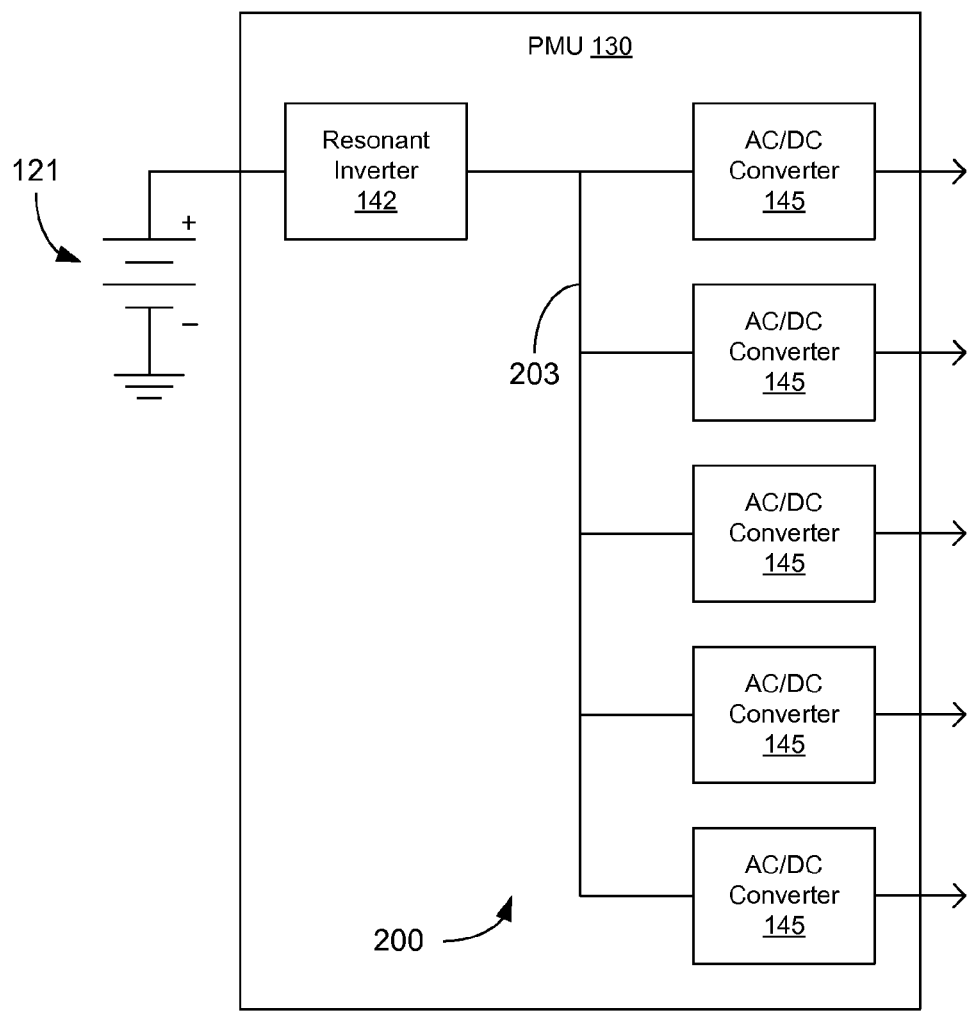
FIGS. 2A and 2B are schematic block diagrams of examples of AC power distribution networks in the PMU of FIG. 1 in accordance with various embodiments of the present disclosure.

Referring now to FIG. 2A, shown is an example of an AC power distribution network 200 of the PMU 130. The AC power distribution network 200 includes a resonant inverter 142 that converts DC power from the power source 121 (e.g., a battery) into AC power that is provided over an AC bus 203 to one or more AC/DC (alternating current to direct current) converters 145. For example, the resonant inverter 142 can provide a quasi-sinusoidal AC voltage to one or more AC/DC converters 145. Providing a quasi-sinusoidal AC voltage can reduce noise and interference from the AC power distribution network 200. The AC/DC converters 145 convert the AC power from the AC bus 203 to DC power that is provided to one or more load(s) in the mobile device 100. While the AC bus 203 in FIG. 1 is depicted as a main trace with branches to each of the AC/DC converters 145, other configurations may be utilized as can be understood. For instance, the AC/DC converters 145 may be grouped at different locations in the PMU 130. The separate traces may be routed to a group with branches to each of the AC/DC converters 145 in the group. Moreover, traces and branches of the AC bus 203 may be sized to reduce or minimize voltage drop based upon designed current flows during operation of the mobile device 100. In some embodiments, some or all of the AC bus 203 may be shielded to reduce interference with other circuits in the PMU 130. By utilizing a single resonant inverter 142 and AC/DC converters, the AC power distribution network 200 may be implemented with a single inductor while providing multiple DC outputs.

Figure 2B:
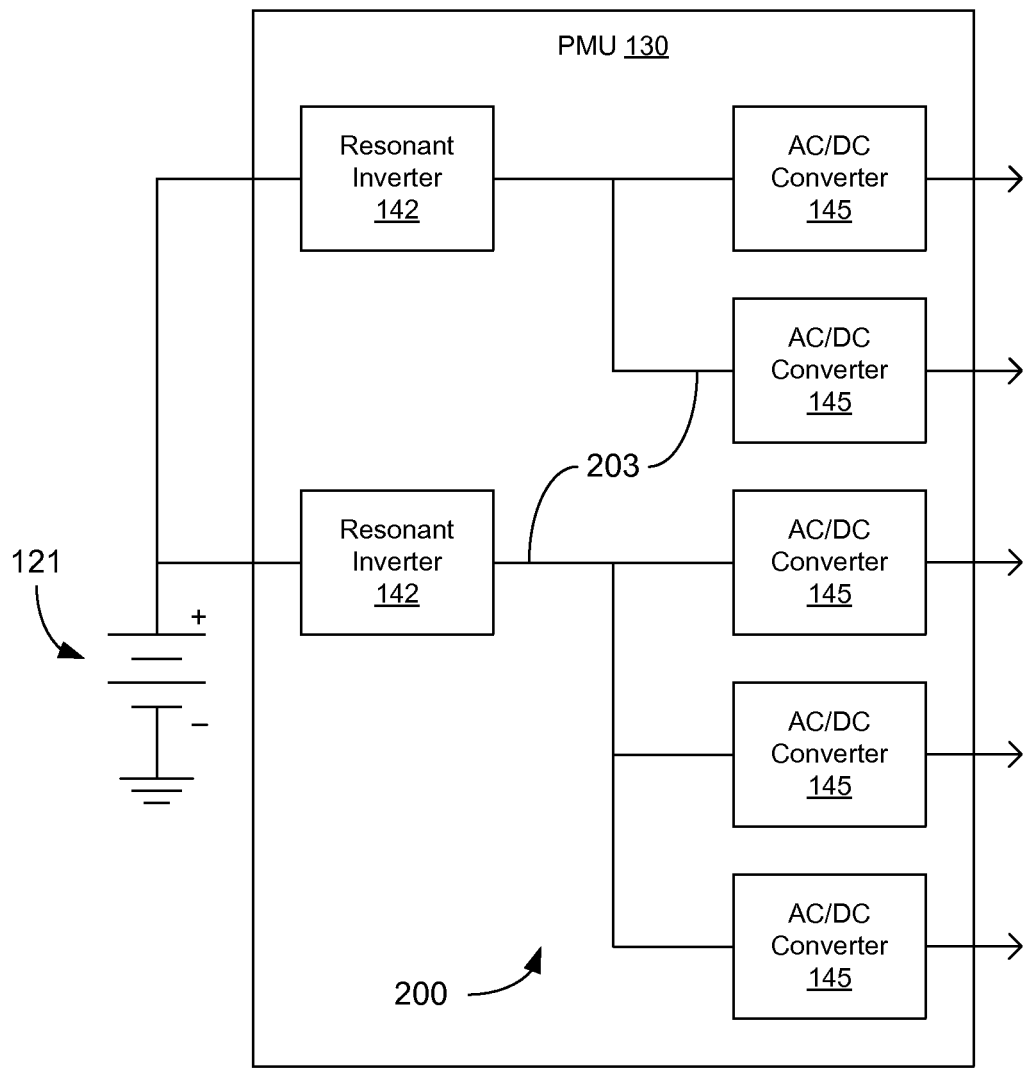

In some implementations, the AC power distribution network 200 includes a plurality of resonant inverters 142 that are configured to convert DC power from the power source 121 to polyphase AC power with two or more phases. Referring next to FIG. 2B, shown is an example of another AC power distribution network 200 with two resonant inverters 142. Each resonant inverter 142 converts DC power from the power source 121 to AC power at the same frequency, but with a phase difference between the two AC outputs. The AC power from each resonant inverter 142 is provided to different groups of one or more AC/DC converter(s) 145. By controlling the phase difference between the AC outputs of the resonant inverters 142, current demand on the power source 121 can be smoothed, thereby reducing peak current levels (and heating) seen by the power source 121. The AC/DC converters 145 supplied by each resonant inverters 142 may be grouped to balance loading of the resonant inverters 142.

In some implementations, an AC/DC converter 145 (e.g., supplying a high load application) may receive polyphase AC power from a plurality of resonant inverters 142 with different phase shifts. In other implementations, the resonant inverters 142 may provide AC power at different frequencies. For example, if the mobile device loads associated with one group of AC/DC converters 145 have entered a sleep or reduced power mode, the resonant inverter 142 providing AC power to the group may operate at a lower frequency (e.g., 500 kHz) to reduce losses without adversely affecting the mobile device loads. The other resonant inverter 142 may supply its group of AC/DC converters 145 at a higher frequency during normal operation of the corresponding loads. The lower frequency of the resonant inverter 142 may result in reduced losses and heating, as well as a reduction in interference with other circuits in the PMU 130.

Figure 3:
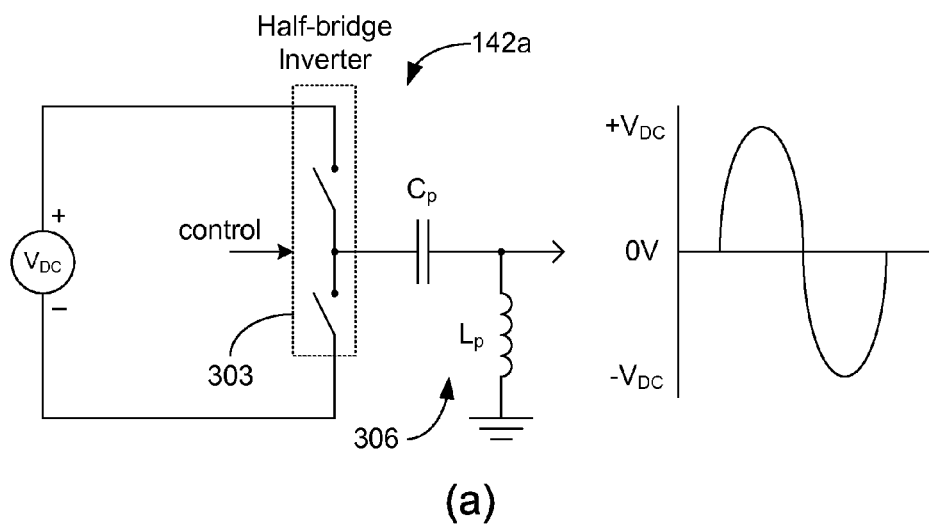
FIG. 3 depicts graphical representations of examples of resonant inverters in the AC power distribution network of FIG. 2 in accordance with various embodiments of the present disclosure.
Figure 3:
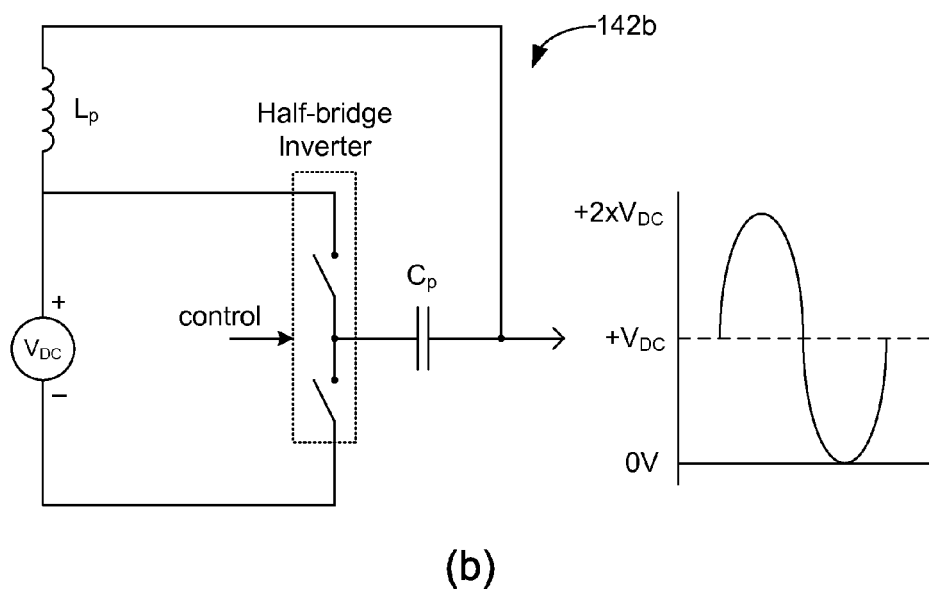

Referring to FIGS. 3(*a*) and 3(*b*), shown are graphical representations of examples of resonant inverters 142 that may be used to convert DC power into AC power using a half-bridge inverter 303. Half-bridge inverters offer a simple design that can be implemented with a minimal amount of components. As can be understood, other resonant inverter implementations (e.g., full-bridge inverters) may be used in other embodiments. Switching of the half-bridge inverter 303 is controlled by the PMU 130 to provide an alternating DC voltage (square wave) to a resonant circuit 306 (e.g., $C_p$ and $L_p$) at a resonant frequency corresponding to the resonant circuit 306. The resulting output of the resonant circuit 306 provides a quasi-sinusoidal AC output. The AC voltage amplitude is based upon the power source 121 and may be controlled through switching of the half-bridge inverter 303. As illustrated in FIG. 3(*a*), the AC output of the resonant inverter 142*a* may alternate about a ground potential. In other embodiments, the AC output may be shifted by a controllable amount of DC offset. For example, the AC output of the resonant inverter 142*b* may be shifted by voltage level the power source 121 as illustrated in FIG. 3(*b*). In this way, it may be possible to produce peak voltage levels at up to twice the power supply voltage level and thus provide a boost capability to the resonant inverter 142. In some embodiments, a linear regulator or other appropriate circuitry may be used to control the amount of DC offset.

In some embodiments, the frequency of the AC power may be in a range from about 200 kHz to about 10 MHz or more. By operating in a range from about 2 MHz to about 8 MHz, size of the AC power distribution network components can be reduced. This is balanced with switching losses in the AC power distribution network components to determine the desired operating frequency. The output frequency of a resonant inverter 142 is controlled by resonant frequency of the resonant circuit 306 (e.g., $C_p$ and $L_p$) and the switching of the inverter 303. If the resonant circuit 306 includes fixed capacitance and inductance elements, then the frequency of the resonant inverter 142 is fixed based upon $C_p$ and $L_p$ and appropriate switching of the half-bridge inverter 303 to excite the resonant circuit 306. If the resonant circuit 306 includes variable capacitance and/or inductance elements, then the frequency of the resonant inverter 142 may be adjusted by changing the resonant frequency of the resonant circuit 306 and varying the switching of the half-bridge inverter 303 accordingly. For example, the capacitor $C_p$ of FIG. 3 may represent a plurality of switched capacitors. By controlling which capacitors are switched (or connected) into the circuit, the resonance frequency may be varied in a step-wise fashion. The inductor $L_p$ may also represent a tapped (or variable) inductor. By controlling the amount of inductance in the resonant circuit 306, the resonant frequency may be varied. In some embodiments, both the capacitance and the inductance may be varied along with the switching of the half-bridge inverter 303 to excite the resonant circuit 306.

Figure 4:
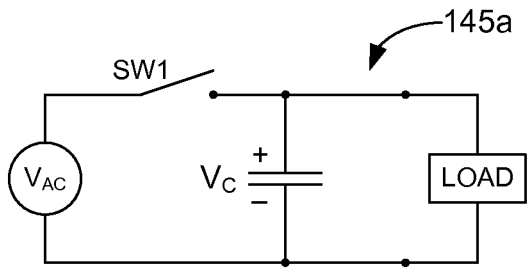
FIG. 4 depicts graphical representations of examples of AC/DC converters in the AC power distribution network of FIG. 2 in accordance with various embodiments of the present disclosure.
Figure 4:
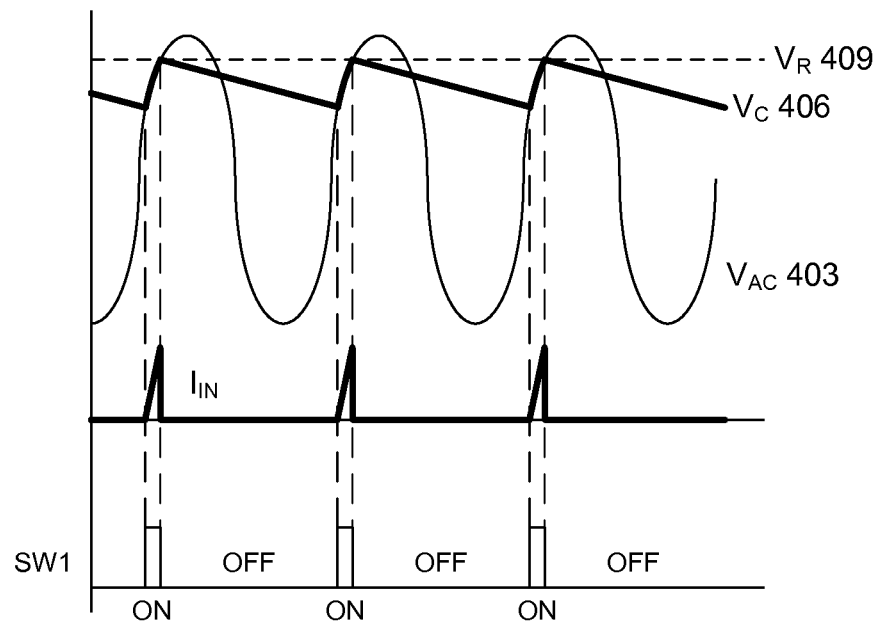
Figure 4:
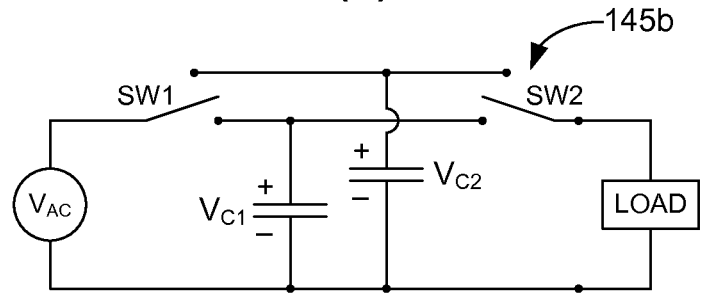

The AC power distribution network 200 (FIGS. 2A and 2B) includes AC/DC converters 145 that are configured to convert AC power from a resonant inverter 142 to DC power that is supplied to one or more loads of the mobile device 100. The AC/DC converters 145 may include, e.g., lossless switched-capacitor power converters. FIG. 4(a) illustrates an example of a simple lossless switched-capacitor power converter 145a that converts AC power obtained from the AC bus 203 (FIGS. 2A and 2B) to DC power by controlling the capacitor voltage ($V_C$) through switching (SW1). As illustrated in FIG. 4(b), when the AC voltage ($V_{AC}$) 403 on the AC bus 203 matches the capacitor voltage ($V_C$) 406, the switching device SW1 (e.g., transistor) is turned on allowing the capacitor to charge ($I_{IN}$) while power is supplied to the load connected to the AC/DC converter 145a. When $V_C$ 406 reaches a reference voltage ($V_R$) 409, the switching device SW1 is turned off and the capacitor supplies power to the connected load. The cycle repeats to maintain the capacitor voltage within the operational band of the load. As can be understood, $V_C$ 406 exhibits a smaller variation when the AC power is supplied at a higher frequency. In some implementations, the quasi-sinusoidal AC power may be rectified to provide additional charging capabilities by turning on the switch twice per cycle. A lower frequency may be used when the mobile device is in a sleep mode or a hibernate mode where a larger voltage variation can be tolerated by the mobile device 100. The reduced switching also reduces losses and heating in the PMU 130 (FIGS. 2A and 2B). By utilizing an AC power distribution network 200 in the PMU 130, a total efficiency of 90% or more may be achieved.

The use of the AC power distribution network 200 also allows for negative DC voltages to be supplied to a load of the mobile device 100. For example, if the AC power provided by a resonant inverter 142 alternates about zero volts, the switching device SW1 of the AC/DC converter 145 can be switched to maintain a negative capacitor voltage ($V_C$) which is then supplied to the connected load. The use of multiple AC/DC converters 145 allows multiple levels of DC voltage to be supplied to different loads of the mobile device 100. In addition, a combination of negative and positive DC voltages can be provided by the AC/DC converters 145 to various loads. The local point of load regulation provided by the AC/DC converters 145 allows the DC voltage levels to be maintained within predefined criteria without being influenced by other loading of the distribution network. For instance, the DC power may be regulated to maintain, e.g., a 5% voltage variation independent of the other loads. In some embodiments, a linear regulator may be included at the output of the AC/DC converter 145 where low noise content is desired for the supplied load (e.g., radio frequency (RF) modules).

In some implementations, the PMU 130 removes the DC voltage supplied to a load when predefined conditions are encountered or criteria are satisfied, allowing the voltage on the load to decay to zero. The switched-capacitor power converter 145a of FIG. 4(a) may be used to drive the load voltage to zero. By turning on the switching device SW1 as the AC voltage on the AC bus 203 returns to zero (along the downward slope of the voltage waveform), the load voltage may be pulled down to quickly de-energize the load. When the AC voltage reaches zero, SW1 is turned off. The extracted energy is supplied back to the AC bus 203, where it may be utilized by other AC/DC converters 145 in a regenerative fashion.

An AC/DC converter 145 may also be configured to obtain polyphase AC power from a plurality of resonant inverters 142. For example, the AC bus 203 can includes a plurality of phases (e.g., two, three, or more), each of which is supplied AC power by a resonant inverter 142 with a different phase shift (e.g., 180 degree phase difference, 120 degree phase difference, etc.). The AC/DC converter 145 would connect to each of the phases of the AC bus 203 through a switching device. The switching devices may be controlled to sequentially connect each phase to charge up the capacitor voltage ($V_C$). In this way, the current capabilities of the AC/DC converter 145 may be increased for high load applications. This configuration may also reduce output ripple of the AC/DC converter 145.

In other implementations, a plurality of AC/DC converters 145 connected to resonant inverters 142 supplying different phases of polyphase AC power can supply a single load. Each AC/DC converter 145 may include a diode in the output connection. The AC/DC converter 145 with the highest capacitor voltage ($V_C$) would supply the load current through the diode. The power supplied to the load would switch from the AC/DC converter 145 when $V_C$ drops below the capacitor voltage ($V_C$) of another AC/DC converter 145.

The AC/DC converters 145 may be configured to isolate the outputs from the AC bus 203 and other AC/DC converters 145. FIG. 4(c) illustrates an example of a lossless switched-capacitor power converter 145b with output isolation. The AC/DC converter 145b converts AC power obtained from the AC bus 203 (FIGS. 2A and 2B) to DC power by controlling the capacitor voltage ($V_C$) through switching of switching devices SW1 and SW2. Two (or more) capacitors are connected between SW1 and SW2. While SW1 is connected to a first capacitor, the load is supplied with DC power from the second capacitor through SW2. When the first capacitor is charged, SW1 is switched to a neural position before SW2 is switched to the first capacitor. After SW2 is switched from the second capacitor to the first capacitor, SW1 is switched from the neutral position to the second capacitor to begin charging as discussed with respect to FIG. 4(a). The switching is repeated when the second capacitor is charged. In this way, DC power is supplied to the load from the two capacitors without direct connection with the rest of the AC power distribution network 200 (FIGS. 2A and 2B).

The PMU 130 (FIGS. 1, 2A, and 2B) may provide monitoring and control functions for the AC power distribution network 200. For example, the frequency of the AC power provided by the resonant inverter(s) 142 may be adjusted based upon an operating mode of the mobile device 100 (FIG. 1). The PMU 130 may be configured to monitor system state commands, interrupts, power usage, etc. of the mobile device 100 and adjust output frequency of one or more resonant inverter(s) 142 of the AC power distribution network 200 in response to a change in the operating mode of the mobile device 100. The microcontroller 133 (FIG. 1) of the PMU 130 may execute a power management service 154 that manages the power functions of the PMU 130.

Figure 5:
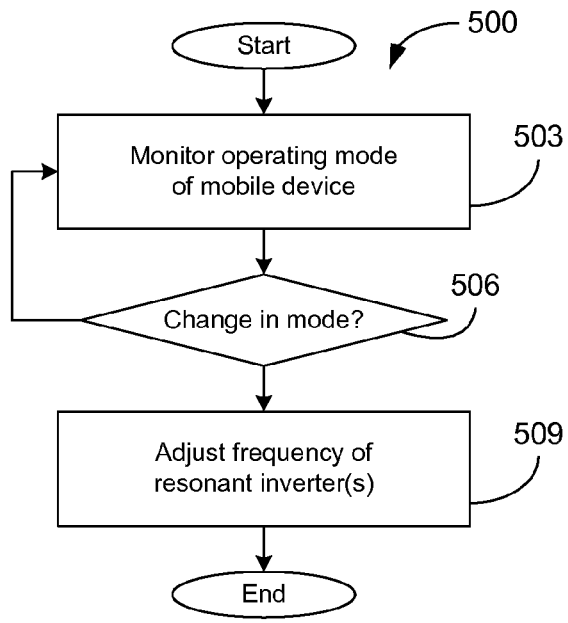
FIGS. 5-6 are flowcharts illustrating examples of power management services implemented by the PMU of FIG. 1 in accordance with various embodiments of the present disclosure.

Referring to FIG. 5, shown is a flowchart 500 illustrating an example of controlling the operation of the AC power distribution network 200 based upon the operation of the mobile device 100. In block 503, the PMU 130 monitors the operating mode of the mobile device 100. For example, the power management service 154 may be configured to monitor for interrupts, system state commands, and/or other changes in the operation of the device 100 (FIG. 1) that indicate a change in the operating mode. Other information may also be used by the power management service 154 to determine a change in the operating mode such as, e.g., other detected interrupts, power usage levels, current flows, and other information monitored by the PMU 130. If a change in the operating mode is detected in block 506 by the PMU 130 (FIG. 1), the PMU 130 adjusts the output frequency of one or more resonant inverter(s) 142 in block 509. As discussed above, the capacitance and/or inductance of the resonant circuit 306 (FIG. 3) of the resonant inverter(s) 142 may be changed to vary the resonant frequency. For example, capacitance be switched in to or out of the resonant circuit 306 using a switched capacitor network and/or the inductance may be varied using a tapped inductor. In addition, switching control of the inverter (e.g., the half-bridge inverter 303 of FIG. 3) is also adjusted for associated the resonant frequency.

The frequencies of all resonant inverters 142 may be changed in the same way (or amount) or the resonant inverters 142 may be adjusted independently. For example, when the mobile device 100 enters a hibernate mode, all of the resonant inverters 142 may operate at a predetermined frequency to reduce power losses. In other cases, the mobile device 100 may include different levels of sleep mode where some resonant inverters 142 operate at different frequencies than other resonant inverters 142 because of, e.g., monitoring functions that are carried out during the sleep mode. In the low power mode, the inverter may be operated at a lower harmonic frequency (e.g., ½, ⅓, etc.) of the resonant frequency to maintain the oscillation in the resonant circuit and maintain output voltage.

Figure 6:
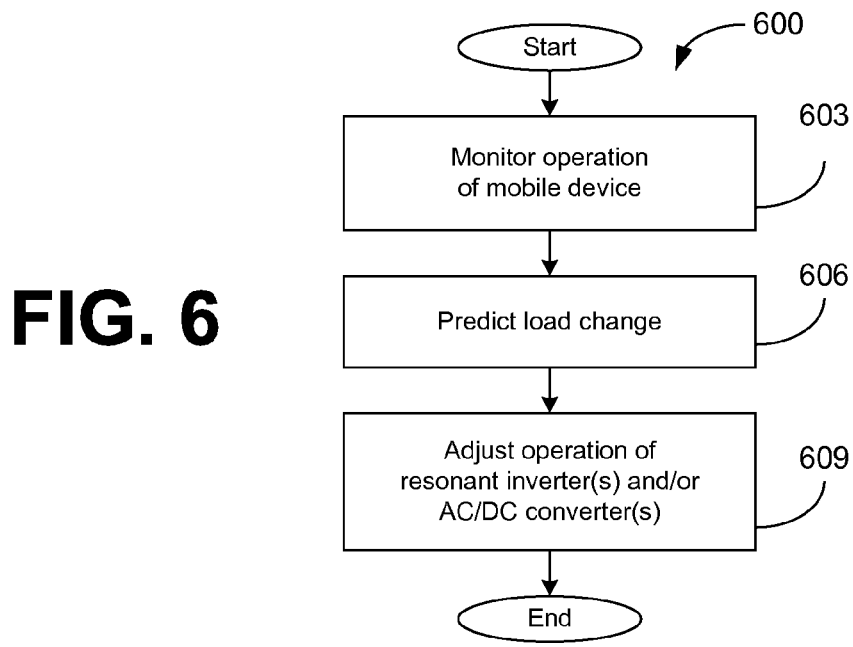

In other implementations, the PMU 130 may be configured to monitor the operation of the mobile device 100 and adjust operation of the AC power distribution network 200 based, at least in part, upon predicted load changes. Referring to FIG. 6, shown is a flowchart 600 illustrating an example of controlling the operation of the AC power distribution network 200 based upon predicted load changes in the mobile device 100. Beginning with block 603, the operation of the mobile device 100 is monitored by the PMU 130. For example, the PMU 130 may monitor operations being implemented by the application processor 103 of the mobile device 100, current load levels, etc. In block 606, the power management service 154 executed by the PMU 130 predicts load changes based, at least in part, upon the monitored operation of the mobile device 100. A predicted increase or decrease in load may be based upon predefined sets of conditions and/or patterns learned from previous operation of the mobile device 100. Operation of the resonant inverter(s) 142 and/or AC/DC converter(s) 145 may be adjusted to compensate based upon the predicted load change. For instance, the output voltage of a resonant inverter 142 may be biased and/or the output frequency of the resonant inverter 142 may be increased in response to (or in anticipation of) the predicted increase in load. The switching of an AC/DC converter 145 may also be adjusted to provide, e.g., a higher capacitor voltage ($V_C$) and thus a higher output voltage to compensate for voltage drop with increased load demand.

The PMU 130 may also provide active feedback for the resonant inverter(s) 142 and/or the AC/DC converter(s) 145 by monitoring the DC output of the AC/DC converter(s) 145. For example, the power management service 154 may adjust operation of the resonant inverter 142 and/or the AC/DC converter 145 to ensure proper DC output for the load attached to the AC/DC converter 145. For example, if it is determined that the DC output voltage is too low, the power management service 154 may adjust the switching of the AC/DC converter 145 (e.g., by adjusting the reference voltage ($V_R$) level) to provide the appropriate DC power for the load. In addition, the operation of the resonant inverter 142 may also be adjusted to ensure appropriate DC power is available. For instance, by adjusting the voltage magnitude (or peak) of the resonant inverter 142 so that the AC/DC switching occurs near the peak, additional current capability may be provided. The resonant inverter 142 frequency may also be adjusted (e.g., increased) to reduce ripple on the output. By reducing the time the switch in the AC/DC converter 145 is turned on, the ripple current may be reduced. The power management service 154 can be configured to account for the effects on the outputs of a plurality of AC/DC converters 145 when adjusting the operation of the supplying resonant inverter 142. Such active feedback control can reduce the effects of voltage drop along the AC bus 203 and improve transient performance by point of load regulation.

A number of software components are stored in the memory 106 or 136 that are executable by the processor 103 or microcontroller 133, respectively. In this respect, the term "executable" means a program file that is in a form that can ultimately be run by the processor 103 and/or microcontroller 133. Examples of executable programs may be, for example, a compiled program that can be translated into machine code in a format that can be loaded into a random access portion of the memory 106 or 136 and run by the processor 103 or microcontroller 133, source code that may be expressed in proper format such as object code that is capable of being loaded into a random access portion of the memory 106 or 136 and executed by the processor 103 or microcontroller 133, or source code that may be interpreted by another executable program to generate instructions in a random access portion of the memory 106 or 136 to be executed by the processor 103 or microcontroller 133, etc. An executable program may be stored in any portion or component of the memory 106 and 136 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Although the electronic power management service 154 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-6 show the functionality and operation of implementation of portions of the power management service 154. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a microcontroller 133 in a PMU 130 or other system. The machine code may be converted from the source code, etc. If embodied in hardware, each block may represent a circuit or a number of interconnected circuits to implement the specified logical function(s).

Although the flowcharts of FIGS. 5-6 show a specific order of execution, it is understood that the order of execution may differ from that which is depicted. For example, the order of execution of two or more blocks may be scrambled relative to the order shown. Also, two or more blocks shown in succession in FIGS. 5-6 may be executed concurrently or with partial concurrence. Further, in some embodiments, one or more of the blocks shown in FIGS. 5-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic, service or application described herein, including the power management service 154 that comprises software or code can be embodied in any non-transitory computer-readable medium for use by or in connection with an instruction execution system such as, for example, a microcontroller 133 in a PMU 130 or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of "about 0.1% to about 5%" should be interpreted to include not only the explicitly recited value of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, having thus described the invention, at least the following is claimed:

1. A mobile device, comprising:
a power source; and
a power management unit (PMU) comprising an AC power distribution network including:
a plurality of resonant inverters coupled in parallel and configured to convert DC power from the power source to AC power;
a plurality of parallel-coupled groups of AC/DC converters distributed about the PMU, each group of the AC/DC converters being coupled to a different one of the plurality of resonant inverters, each of AC/DC converters being configured to convert AC power from a respective resonant inverter to DC power that is supplied to a load of the mobile device; and
an AC bus configured to route the AC power from a respective one of the plurality of resonant inverters to a group of AC/DC converters, wherein the PMU is configured to monitor an operating mode of the mobile device based on detected microcontroller interrupt signals, and wherein the PMU is configured to cause an adjustment of a frequency of the AC power, in response to the monitoring of the operating mode of the mobile device, by adjusting a resonant circuit capacitance of at least one of the plurality of resonant inverters.

2. The mobile device of claim 1, wherein the PMU is configured to adjust frequency of the AC power provided by the resonant inverter based upon an operating mode of the mobile device.

3. The mobile device of claim 2, wherein the frequency of the AC power is reduced when the PMU enters a sleep mode from an operational mode.

4. The mobile device of claim 3, wherein the frequency of the AC power varies in a range from about 2 MHz to about 8 MHz.

5. The mobile device of claim 1, wherein the resonant inverter comprises a plurality of switched capacitors in a resonant circuit of the resonant inverter.

6. The mobile device of claim 1, wherein the PMU comprises a plurality of resonant inverters configured to convert DC power from the power source to polyphase AC power, wherein the AC bus is configured to route AC power from each resonant inverter to a defined group of the plurality of AC/DC converters.

7. The mobile device of claim 6, wherein the groups of the plurality of AC/DC converters are defined to balance loading between the plurality of resonant inverters.

8. The mobile device of claim 1, wherein the PMU further comprises a liner regulator coupled to an output of at least one AC/DC converter to reduce ripple in the DC power supplied to the load.

9. The mobile device of claim 1, wherein the mobile device is a mobile phone or an electronic tablet.

10. A method for power management of a mobile device, comprising:

monitoring, by a power management unit (PMU) of the mobile device, an operating mode of the mobile device based on detected microcontroller interrupt signals; and causing, by the PMU, an adjustment of an output frequency of at least one of a plurality of resonant inverters of an AC power distribution network of the PMU, in response to a change in the operating mode of the mobile device, by adjusting a resonant circuit capacitance of the at least one of the plurality of resonant inverters, wherein each of the plurality of resonant inverters is coupled to a different group of a plurality of parallel-coupled groups of AC/DC converters.

11. The method of claim 10, wherein the change in the operating mode comprises the mobile device entering a sleep mode.

12. The method of claim 10, wherein adjusting the output frequency of the resonant inverter comprises:

changing a resonant frequency of a resonant circuit of the resonant inverter; and adjusting a switching frequency of the resonant inverter.

13. The method of claim 12, wherein a resonant circuit inductance is adjusted to change the resonant frequency.

14. The method of claim 10, wherein the output frequency of at least one of a plurality of resonant inverters of the AC power distribution network is not adjusted in response to the change in the operating mode of the mobile device.

15. A mobile device, comprising:

a power management unit (PMU) comprising an AC power distribution network including:

a plurality of resonant inverters coupled in parallel and configured to convert DC power from a power source to AC power; and a plurality of parallel-coupled groups of AC/DC converters distributed about the PMU, a different group of the AC/DC converters being coupled to each of the plurality of resonant inverters, and each of the plurality of AC/DC converters being configured to convert AC power from a respective resonant inverter to DC power that is supplied to a load of the mobile device; wherein the PMU is configured to monitor an operating mode of the mobile device based on detected microcontroller interrupt signals, and wherein the PMU is configured to cause adjustment of a frequency of the AC power, in response to the monitoring of the operating mode of the mobile device, by adjusting a resonant circuit capacitance of at least one of the plurality of resonant inverters.

16. The mobile device of claim 15, wherein a DC offset of the resonant inverter is adjusted.

17. The mobile device of claim 15, wherein the PMU is configured to adjust switching of the AC/DC converter based at least in part upon its corresponding DC power output.

18. The mobile device of claim 15, wherein the PMU is configured to:

monitor a DC power output of at least a portion of the plurality of AC/DC converters; and adjust the AC power from the resonant inverter based at least in part upon the monitored DC power output.

19. The mobile device of claim 1, wherein at least one of the plurality of AC/DC converters is configured to isolate a corresponding load of the mobile device from an AC bus using a switched capacitor circuit while the DC power is supplied to the load.

20. The mobile device of claim 15, wherein at least one of the plurality of AC/DC converters is configured to isolate a corresponding load of the mobile device from an AC bus using a switched capacitor circuit while the DC power is supplied to the load.

* * * * *